Oct. 8, 1968 G. SCHMELING ET AL 3,404,845
FLUIDIZING-BED PLATE
Filed Oct. 12, 1966
2 Sheets-Sheet 1
FIG.1
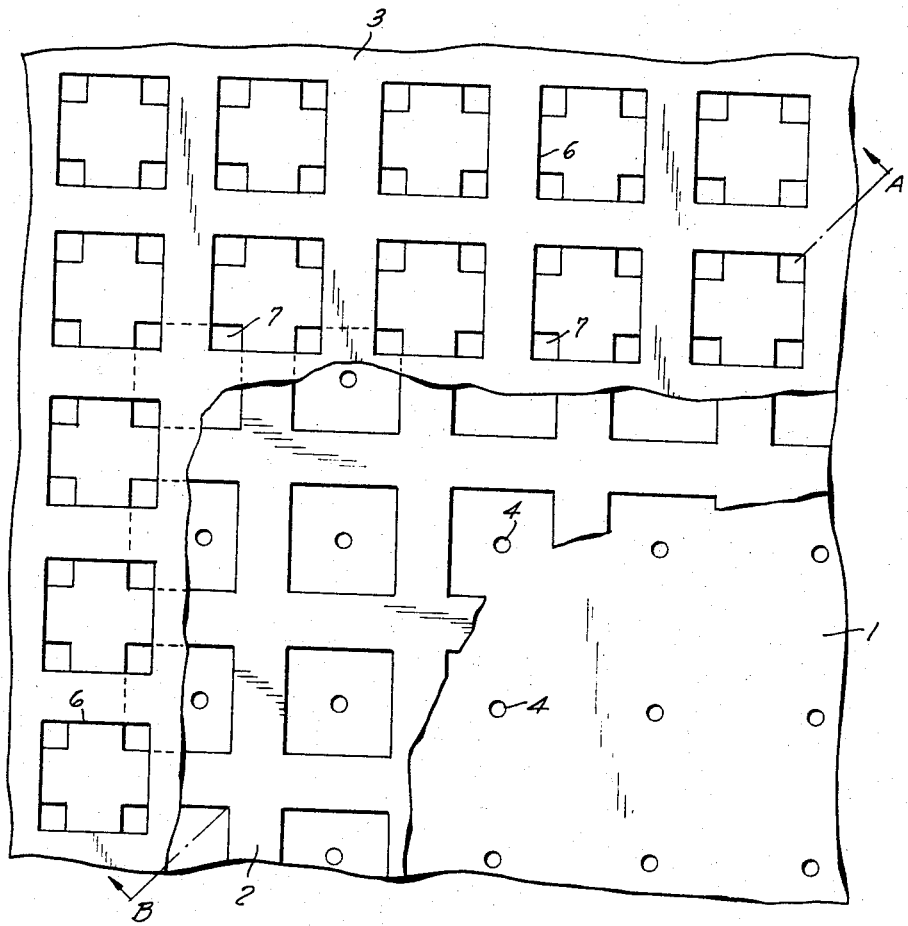
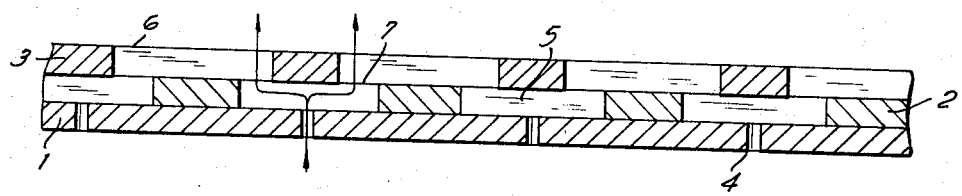
FIG.2
INVENTORS
Gerhard Schmeling
and Kurt Kleisa
BY
Michael S. Striker
ATTORNEY

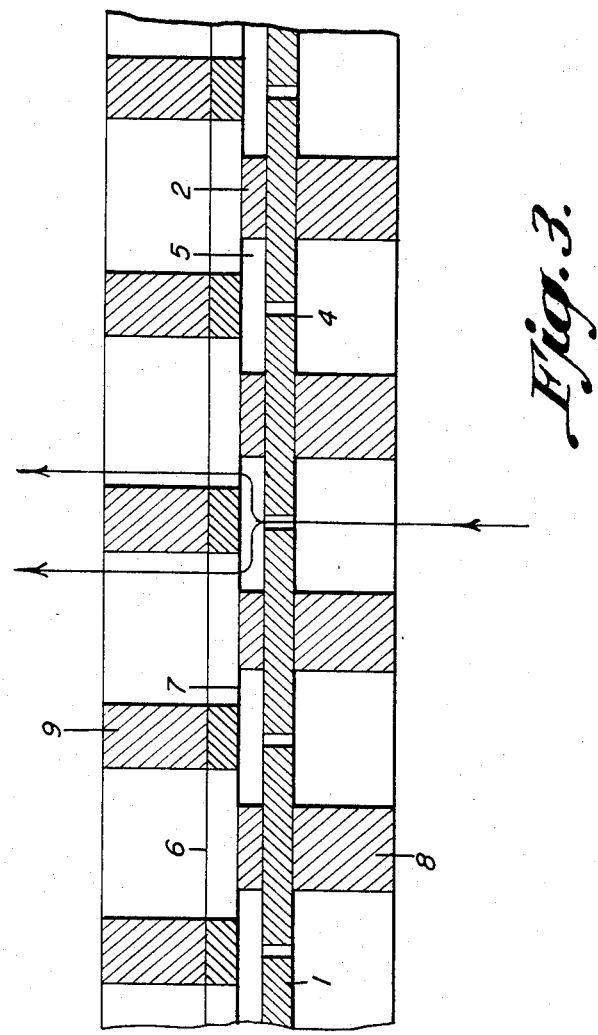

United States Patent Office 3,404,845
Patented Oct. 8, 1968

3,404,845
FLUIDIZING-BED PLATE
Gerhard Schmeling, Cologne-Dellbrueck, and Kurt Kleisa, Essen, Germany, assignors to Bergwerks-verband G.m.b.H., Essen, Germany
Filed Oct. 12, 1966, Ser. No. 586,137
Claims priority, application Germany, Oct. 15, 1965, B 84,120
10 Claims. (Cl. 239—556)

The present invention relates to a fluidizing-bed plate. More specifically, it relates to an apertured plate on which a fluidized bed of particulate material is to be formed.

In the fluidizing of particulate material it is necessary to provide a plate having an upper and a lower surface, with the particulate material to be fluidized resting on the upper surface and with the fluidizing fluid, namely the gas or other fluid utilized for this purpose, impinging against the lower surface. Naturally, the plate must be permeable to the fluid so that the same can have access to the particulate material resting on the upper surface of the plate. The plate is therefore perforated or otherwise apertured.

However, the construction of plates suitable for this purpose is not as simple as it might at first sight appear to be. The reason for this is that, while on the one hand the fluid must be able to pass from the lower surface to the upper surface and therebeyond into the particulate material which is to be fluidized, this material must not be able to fall into and through the apertures in the plate through which the fluidizing gas or other fluid passes in upward direction. Of course this problem does not exist while the fluidizing fluid, which for the sake of convenience will hereafter be referred to as "the gas," flows from the lower to the upper surface since obviously the flow of the fluid which is under a given pressure will prevent particulate material from falling into the plate apertures. However, whenever the fluid flow is terminated, for instance for reasons which are dictated by manufacturing considerations, the particulate material can then fall into and through the plate apertures.

Attempts have been made to overcome this by making the apertures of the plate so small that the particulate material cannot pass through them. Since, however, each particulate material which is to be fluidized requires a certain flow speed of the gas in order to achieve the fluidized state, and since this speed can be varied only within a very small range and is dependent upon the space above the apertured plate, it has heretofore been necessary in customary plates to provide either a great number of small openings or, if large openings are provided, to provide few openings in order to obtain in either case the necessary flow resistance required for making the gas fully effective for the fluidization of the particulate material. Of course, in plates having a great number of very small apertures, it is necessary to clean the apertures very frequently in order to remove any particulate material which clogs the apertures. This is a rather difficult procedure and therefore expensive, and also requires frequent shut-down of the apparatus. On the other hand, if larger openings are provided the particulate material will fall through these openings, as mentioned earlier, whenever the flow of gas is terminated. Also, proper fluidization of the particulate material is not guaranteed with plates having relatively few but large and relatively far-spaced openings because of the rather large non-apertured areas between these openings. This results in the formation of channels in the material to be fluidized. Attempts have been made to overcome in the latter type of plate, namely the type with few and large openings, these disadvantages by providing covers which are spaced from the surface or surfaces of the fluidizing-bed plate. This, however, results in a very significant increase in the manufacturing cost of the plates and is therefore highly undesirable.

It is thus a general object of the present invention to provide a fluidizing-bed plate which is not subject to the disadvantages outlined above.

A more specific object of the invention is to provide a composite fluidizing-bed plate.

A further object is to provide a plate of the type just mentioned which is simple to manufacture and is inexpensive.

An additional object of the invention is to provide a plate which is easy to clean.

In accordance with one feature of our invention we provide, for use in fluidizing beds, a composite plate having an upper surface which particulate material is to rest on and a lower surface against which a moving fluid is to impinge. This composite plate includes at least three coextensive sheets which are superimposed in face-to-face contact. The lowermost one of the sheets has a plurality of relatively small perforations, the middle one of the sheets has a corresponding plurality of relatively large perforations and these perforations are so arranged that their centers coincide with the small perforations in the lowermost one of the sheets. Finally, there is an uppermost sheet having also a plurality of perforations which correspond in size to those of the little sheet. Since the perforations are spaced from one another there is a non-apertured solid sheet portion between any adjacent apertures in the third plate and the arrangement of the apertures and the non-apertured solid portions in the third plate is such that each of the apertures in the middle plate is overlain by a section of solid portion and by a section of one of the apertures in the uppermost third sheet in such a way that the solid section is directly above the small aperture in the lowermost part of the sheets. Thus, fluid passing through the composite plate is forced to traverse a circuitous path and the same is true of any particulate material which might fall into the apertures of the composite plate, making it difficult if not impossible for particulate material to fall through from the upper to the lower surface of the composite plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a top-plan view of a section of a composite plate in accordance with the present invention, portions of the middle and uppermost sheets being broken away for clarity;

FIG. 2 is a sectional elevation taken on the line A–B of FIG. 1; and

FIG. 3 is a view similar to that of FIG. 2, but showing additional apertured plates provided in conjunction with the construction of FIG. 2.

Discussing now the drawing in detail, and firstly FIG. 1 thereof, it will be seen that the distribution of the apertures in the various sheets of the composite plate shown there is essentially quadratic. The lowermost sheet is indicated with reference numeral 1 and provided with apertures 4 which are spaced from one another at identical intervals and which are arranged in quadratic form. The apertures 4 in this case are round although of course they could be of any other configuration. It should also be understood in this context that a non-quadratic pattern could be selected for these various apertures, not only in the lowermost sheet but also in the others. This depends entirely on the specific purposes for which the composite plate is intended and it is only necessary that the arrangement of the apertures follow an identical pattern in all sheets of the composite plate.

The middle or second sheet 2 overlies the lowermost sheet 1 and is provided with a number of apertures 5 which correspond in quantity to the apertures 4 of the lowermost sheet 1. The apertures 5 in the middle plate 2 are in the illustrated embodiment of quadratic configuration and have side edges which are slightly longer than half the distance between the centers of the apertures 4 in the plate 1. Putting this in a more generalized form it should be said that the edges are slightly longer than half the distance between the centers of any apertures in plate 1, regardless of their distribution. The middle plate 2 is placed onto the lowermost plate 1 in such a manner that the centers of apertures 4 and 5 coincide exactly. In the embodiment shown in the drawing the thickness of the middle plate 2 is approximately double that of the diameter of the openings 4 although it should be understood that the thickness can be varied. Also, the thickness of the lowermost plate 1 and the uppermost plate 3 can be selected depending upon the required stability of the composite plate.

The uppermost sheet 3 is provided with a plurality of apertures which are of identical size and identically spaced as are those of the middle sheet 2. However, the uppermost sheet 3 is placed onto the middle sheets 2 in such a manner that the solid portions intermediate the apertures 6 overlie the centers of the apertures 5 of the middle sheet 2 and of the apertures 4 of the lowermost sheet 1. This must be so, regardless of what spacing or arrangement is selected for the apertures in the various sheets.

In the embodiment shown the construction and arrangement of the openings provides for open sections 7. Should the arrangement of the various apertures be triangular rather than quadratic, for example, then there would be course always be three open segments. In any case, these open segments through which the gas can pass always coincide with one opening 4 in the lowermost sheet 1.

The sectional view shown in FIG. 2 indicates by way of the arrows shown in conjunction with one set of apertures for the three sheets how the gas will pass through the composite plate. It is clear that this circuitous path provides the required flow resistance for the gas, whereas the particular construction of the plate and of the various coincident apertures makes it possible to utilize openings of rather large size with the advantage that they cannot be clogged by particulate material whereas at the same time the particulate material is not able to fall through these openings when the flow of gas is terminated for any reason. Furthermore, it is a decided advantage that plates in accordance with the present invention are very simple to manufacture and therefore are highly economical. All that is required is punching of the holes in the various sheets and assembling of the sheets into a composite plate in the proper relationship.

Obviously, various modifications are possible and will be evident to those skilled in the art. These modifications are intended to be included in the protection sought. It should be additionally pointed out that it is advantageous if the thickness of plate 2 is at least equal to or greater than the diameter of the openings 4 in the lowermost sheet 1. Furthermore, and particularly in order to achieve greater stability for the composite plate if this is necessary, additional apertured sheets can be provided at one or both surfaces of the composite plate shown in FIG. 1. This is shown in FIG. 3 where an additional plate 8 will be seen overlying one surface of the composite plate and a similar overlying one surface of the composite plate and a similar plate 9 overlies the other surface of the composite plate. In other respects FIG. 3 does not differ from FIGS. 1 and 2 so that it is not believed to require any additional discussion. Advantageously, the spacing and configuration of the openings in such plates will be identical with or substantially similar to that selected for the uppermost sheet 3.

It will be understood that each of the elements described above, or two or more together, may also find a useful application in other types of fluidizing-bed plates differing from the types described above.

While the invention has been illustrated and described as embodied in fluidizing-bed plates, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from characteristics of the generic or specific aspects of this invention and, therefore, such adaptations should and are intended to be comprehended within the meaning and range of equivalent of the follow claims.

What is claimed as new and desired to be secured by Letters Patent is:

1. For use in fluidizing beds, a composite plate structure having an upper surface on which particulate material to be fluidized is adapted to be located, and a lower surface exposed to the fluidizing medium, said composite plate structure including at least a lower, a middle and an upper plate superimposed upon each other, said lower of said plates having a plurality of spaced apertures therethrough; said middle one of said plates being superimposed upon said lower plate and having a plurality of apertures overlapping at least partly said apertures in said lower one of said plates and having a cross-sectional area greater than the area of the respective exposed portion of the corresponding aperture in said lower sheet; and an upper plate superimposed upon said middle plate and having a plurality of apertures corresponding to said apertures in said middle plate and each of said apertures of said upper plate being aligned with a portion of an aperature in said middle plate, which portion is not in alignment with said exposed portion of the corresponding aperature in said lower plate, whereby said apertures form for the fluidizing medium composite circuitous passages which extend in a direction other than normal to the general plane of said composite plate structure.

2. A composite plate structure as defined in claim 1, wherein the spacing and arrangement of said apertures in the respective plates is identical.

3. A composite plate structure as defined in claim 1, wherein the diameter of the apertures in said middle plate is slightly greater than half of the distance between the centers of adjacent ones of said apertures.

4. A composite plate structure as defined in claim 1, wherein said apertures in said middle plate are of substantially quadratic configuration and the length of the side edges of the respective apertures is slightly greater than half the distance between the centers of adjacent ones of said apertures.

5. A composite plate structure as defined in claim 1, wherein the thickness of said middle plate is at least equal to the maximum transverse dimension of said apertures in said lower plate.

6. A composite plate structure as defined in claim 1, wherein said apertures in said lowermost plate are circular, and wherein the thickness of said middle plate is at least equal to the diameter of said apertures in said lowermost plate.

7. A composite plate structure as defined in claim 1, wherein the size of said apertures in said lowermost plate just exceeds the size of the largest individual particles contained in the particulate material which is to be fluidized.

8. A composite plate structure as defined in claim 1, wherein the thickness of said middle plate is greater than the maximum transverse dimension of said apertures in said lowermost plate.

9. A composite plate structure as defined in claim 1, and further comprising at least one additional apertured plate overlying at least one of said surfaces for supporting and reinforcing said first-mentioned plates.

10. A composite plate structure as defined in claim 1; and further comprising at least one additional apertured plate overlying each of said surfaces for supporting and reinforcing said first-mentioned plates.

References Cited

UNITED STATES PATENTS

| | | | |
|---|---|---|---|
| 2,876,079 | 3/1959 | Upchurch et al. | 34—57 X |
| 2,893,849 | 7/1959 | Krebs | 34—57 X |
| 3,192,644 | 7/1965 | Knibbs et al. | 34—57 |

M. HENSON WOOD, Jr., *Primary Examiner.*

M. Y. MAR, *Assistant Examiner.*